(12) United States Patent
Bender

(10) Patent No.: US 10,275,504 B2
(45) Date of Patent: Apr. 30, 2019

(54) UPDATING DATABASE STATISTICS WITH DYNAMIC PROFILES

(71) Applicant: International Business Machines Corporation, Armonk, NY (US)

(72) Inventor: Michael Bender, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 14/185,989

(22) Filed: Feb. 21, 2014

(65) Prior Publication Data

US 2015/0242476 A1 Aug. 27, 2015

(51) Int. Cl.
*G06F 17/00* (2006.01)
*G06F 17/30* (2006.01)

(52) U.S. Cl.
CPC .............. *G06F 17/30563* (2013.01)

(58) Field of Classification Search
CPC ................................................ G06F 17/30563
See application file for complete search history.

(56) References Cited

U.S. PATENT DOCUMENTS

| | | | | |
|---|---|---|---|---|
| 2005/0097091 | A1* | 5/2005 | Ramacher | G06F 17/30306 |
| 2006/0149695 | A1* | 7/2006 | Bossman | G06F 17/30315 |
| | | | | 706/48 |
| 2007/0074155 | A1 | 3/2007 | Ama et al. | |
| 2008/0133454 | A1* | 6/2008 | Markl | G06F 17/30457 |
| 2008/0208855 | A1* | 8/2008 | Lingenfelder | G06F 17/30569 |
| 2008/0275840 | A1* | 11/2008 | Burger | G06F 17/30398 |
| 2012/0173823 | A1* | 7/2012 | Nelke | G06F 17/30592 |
| | | | | 711/141 |
| 2014/0279640 | A1* | 9/2014 | Moreno | G06Q 50/265 |
| | | | | 705/325 |

(Continued)

OTHER PUBLICATIONS

Allan, David, "Performance tuning mappings", Oracle Warehouse Builder (OWB), May 29, 2008, <https://blogs.oracle.com/warehousebuilder/entry/performance_tuning_mappings >.

(Continued)

*Primary Examiner* — Sherief Badawi
*Assistant Examiner* — Lahcen Ennaji
(74) *Attorney, Agent, or Firm* — Anthony Curro

(57) ABSTRACT

Embodiments of the present invention disclose a method, computer program product, and system for updating database statistics using profiles. A computer determines whether an application credential has authority to update a database statistic of a target database, based, at least in part, on a profile. Responsive to determining that the application credential has authority to update the database statistic, the computer loads the transformed data into the target database. The computer determines whether an update to the statistic is to be performed. Responsive to a determination that the update to the statistic is to be performed, the computer generates a profile name. The computer determines whether the generated profile name exists within a system catalog of the target database. Responsive to a determination that the generated profile name exists, the computer transmits a command to update the database statistic of the target database using the generated profile name.

20 Claims, 5 Drawing Sheets

(56) References Cited

U.S. PATENT DOCUMENTS

2015/0047015 A1* 2/2015 Lahteenmaki .......... G06F 21/62
726/17

OTHER PUBLICATIONS

Baragoin et al., "DB2 Cube Views—Getting Started with Meta Integration", DB2 Information Management Software, IBM Redpaper, Sep. 2003, Copyright IBM Corp. 2003, pp. 1-116, <ibm.com/redbooks>.

Song et al., "Design ETL Metamodel based on UML Profile", 2009 Second International Symposium on Knowledge Acquisition and Modeling, IEEE Computer Society, 978-0-7695-3888-4/09, Copyright 2009 IEEE, pp. 69-72.

"ETL, Statistics and CBO.", Ask Tom Oracle, Nov. 30, 2009, <http://asktom.oracle.com/pls/asktom/f?p=100:11:0::::P11_QUESTION_ID:2154948600346284491 >.

"System and Methods to Dynamically create ETL processes, execute them remotely and consume its report in alternate process(es)", Authors Disclosed Anonymously, IP.com Prior Art Database Technical Disclosure, IPCOM000222901D, Oct. 29, 2012, pp. 1-8.

* cited by examiner

UPDATING DATABASE STATISTICS WITH DYNAMIC PROFILES

BACKGROUND

The present invention relates generally to the field of database management, and more particularly to updating database statistics using dynamic profiles during the extract, transform, and load (ETL) process.

ETL (extract, transform, and load) systems facilitate extracting data from various sources, transforming the extracted data to fit operational requirements, and loading the transformed data into a data repository, such as a database at a target location. In many cases, the data that is extracted and accumulated is in a different format than what is ultimately needed in the target data repository. The process of acquiring this data and converting it into useful, compatible, and accurate data is referred to as an ETL process, as in extract, transform, and load.

In an ETL process, the extract phase acquires data from the source system(s). Data extraction can be as simple as copying a flat file from a database or as sophisticated as setting up interdependencies with remote systems that then supervise the transportation of source data to the target system. The extracted source data is typically stored as one or more relational database tables. The transform phase in the ETL process is typically made up of several stages and includes parsing data, converting data formats, and merging extracted source data to create data in a format suitable for the data repository, or target database(s). The load phase of the ETL process includes depositing the transformed data into the new data store (e.g., the data repository, Warehouse, mart, etc.). When the data repository is a relational database, the load process is often accomplished with structured query language (SQL) commands (e.g., IMPORT), utilities (e.g., LOAD), or other SQL tools.

Relational database systems store data in tables that are organized into rows and columns. This allows large volumes of data to be accessed efficiently and conveniently in response to SQL (Structured Query Language) statements, such as SELECT, INSERT, DELETE, and UPDATE. Since SQL is a declarative language, i.e., it only specifies what data is to be accessed, not how that data is to be accessed, database systems include optimizers that formulate different plans for accessing data. Database administrators regularly perform updates to database statistics in order to facilitate query optimization. Database object statistics are used by the query engine to determine access paths. Current database statistics allow the query engine to create the optimal access pathway for retrieving specific data from relational databases through SQL commands. An optimal access pathway provides for improved query performance, and reduces the burden on system resources.

SUMMARY

Embodiments of the present invention disclose a method, computer program product, and system for updating database statistics using profiles. A computer determines whether an application credential has authority to update a database statistic of a target database, based, at least in part, on a profile. Responsive to determining that the application credential has authority to update the database statistic, the computer loads the transformed data into the target database. The computer determines whether an update to the statistic is to be performed. Responsive to a determination that the update to the statistic is to be performed, the computer generates a profile name for updating the database statistic. The computer determines whether the generated profile name exists within a system catalog of the target database. Responsive to a determination that the generated profile name exists, the computer transmits a command to update the database statistic of the target database using the generated profile name.

DETAILED DESCRIPTION

After loading data into a database through an ETL (extract, transform, and load) tool, an update to the database statistics is performed to optimize the performance of any subsequent queries of the database tables. Database statistics updates in an environment using distributed ETL tools are currently performed using a manual process of stopping a data-related application in the middle of a job stream, and contacting the database administrator to perform the update, or refresh, of the database statistics using an existing statistics profile. Any further ETL processes are on hold until the database administrator is reached and the update is performed. Alternatively, statistics updates are hard coded into a data-related application with a single profile. Embodiments of the present invention provide for automated updating of database statistics as part of the ETL process, and provide for dynamic criteria for selecting statistics profiles located within the target database system catalog. Embodiments of the present invention recognize that automation of the statistics update procedure will free up time for database administrators, and since updates may be performed more often, queries will run smoother without wasting valuable computing resources. Implementation of embodiments of the invention may take a variety of forms, and exemplary implementation details are discussed subsequently with reference to the figures.

Implementation of embodiments of the invention may take a variety of forms, and exemplary implementation details are discussed subsequently with reference to the figures. The embodiment illustrated in the figures describes the interaction of a relational database and query statements, using SQL as the query language. Specific details disclosed herein are not to be interpreted as limiting, but merely as a representative basis for teaching one skilled in the art to variously employ the methods and structures of the present disclosure. Embodiments of the present invention may apply to all database types, including but not limited to relational, hierarchical, network, and object-oriented databases. Likewise, embodiments of the present invention may apply to other query languages, including but not limited to SQL, QUEL, OQL, and SEQUEL.

Figure 1:
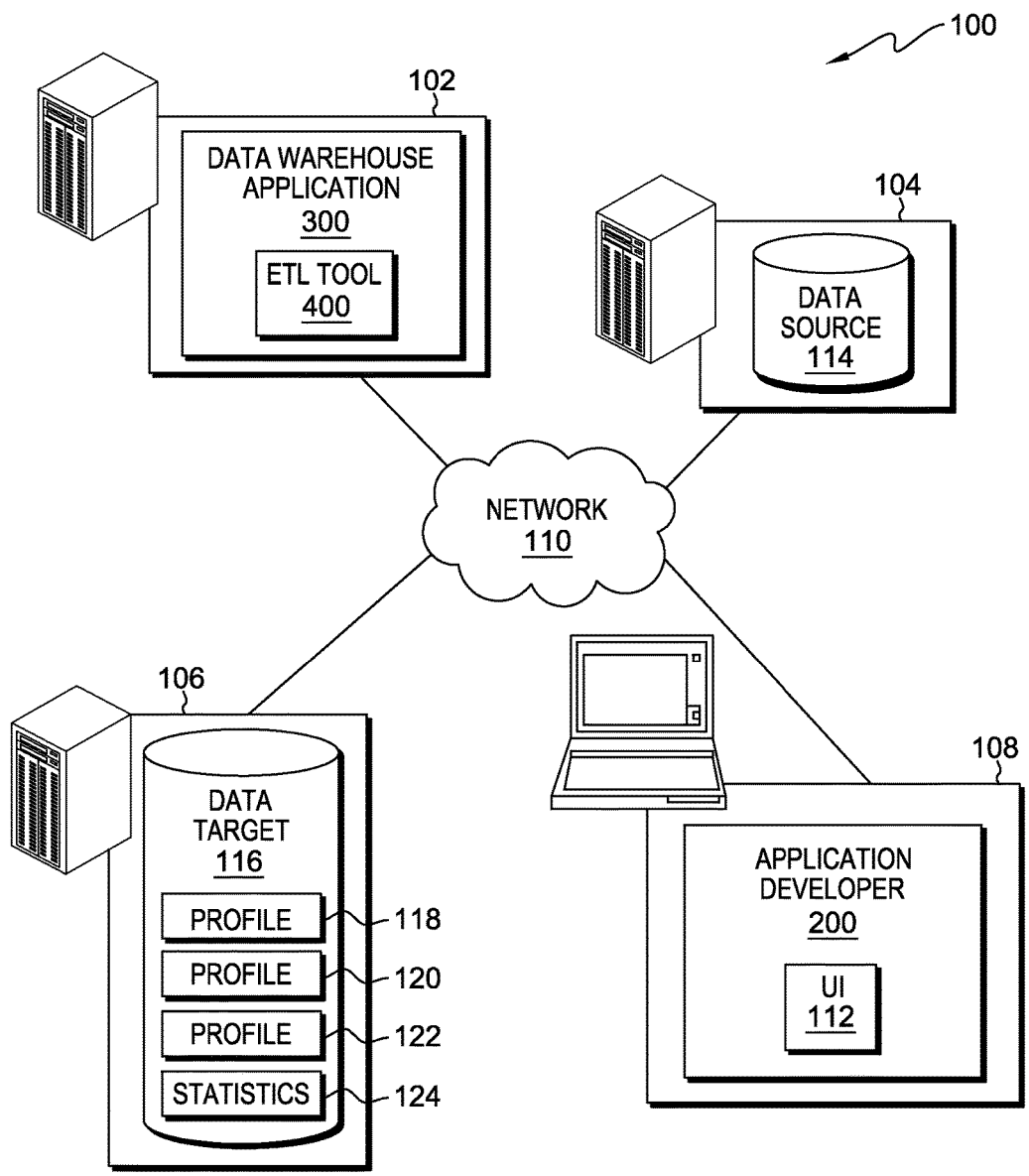
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. Distributed data processing environment 100 includes server computers 102, 104, and 106, and client computer 108, interconnected over network 110. Distributed data processing environment 100 may include additional server computers, client computers, or other devices not shown.

Network 110 can be, for example, a local area network (LAN), a wide area network (WAN) such as the Internet, or a combination of the two, and can include wired, wireless, fiber optic, or any other connection known in the art. In general, network 110 can be any combination of connections and protocols that may support communications between server computers 102, 104, and 106, and client computer 108, in accordance with a desired embodiment of the present invention.

Server computers 102, 104, and 106 can each respectively be a server computer, an application server, a laptop computer, a tablet computer, a netbook computer, a personal computer (PC), a desktop computer, a personal digital assistant (PDA), a smart phone, or any programmable electronic device capable of communicating with client computer 108, and the remaining server computers via network 110. In certain embodiments, server computers 102, 104, and 106 can each respectively represent a computer system utilizing clustered computers and components that act as a single pool of seamless resources when accessed through network 110, as is common in data centers and with cloud computing applications. Server computers 102, 104, and 106 may each be a node in a distributed database management environment. In general, server computers 102, 104, and 106 can each respectively be representative of any computing device or a combination of devices with respective access to data warehouse application 300, ETL tool 400, data source 114, and data target 116, and are respectively capable of executing data warehouse application 300 and ETL tool 400. Server computers 102, 104, and 106 may each include internal and external hardware components, as depicted and described in further detail with respect to FIG. 5.

Server computer 102 includes an instance of data warehouse application 300, and ETL tool 400. In the depicted environment, data warehouse application 300 is a custom written application to extract data from data source 114, transform the extracted data to meet requirements of data target 116, and load the transformed data into data target 116. After each load portion of the job stream of data warehouse application 300, data warehouse application 300 may request a statistics update task using a specified profile, such as profile 118. A job stream is a sequence of operational steps within a data integration application. Data warehouse application 300 may perform other tasks such as create and publish a report from the updated database after the ETL task is finished. In other embodiments of the present invention, data warehouse application 300, data source 114, and data target 116 may be on one computer, or more than one computer, and each item itself may be split into a plurality of parts or modules and spread across more than one computer. In any configuration, the following is maintained: data warehouse application 300 is connected to data source 114 and data target 116. An example of a job stream within data warehouse application 300 is described further in FIG. 3.

ETL tool 400 is middleware that allows a developer to specify the requirements for performing ETL (extract, transform, and load) tasks between customized data-related applications. ETL tool 400 provides the application programming interfaces (API) that enable custom applications to connect to databases and issue commands for manipulating databases saving a developer from having to write complex ETL code. ETL tool 400 may be fully integrated with, partially integrated with, or be completely separate from data warehouse application 300. ETL tool 400 is described further in FIG. 4.

Server computer 104 includes an instance of data source 114, and is coupled to server computer 102 via network 110. Data source 114 may include one or more of the following: a relational database, flat files, comma-separated text, a non-relational database, hierarchical databases, or other data structures such as Virtual Storage Access Method (VSAM), and Indexed Sequential Access Method (ISAM). Data warehouse application 300 may collect data from various sources, all of which are included in data source 114, each with differing formats of data organization, and which are transformed into a single format appropriate for validation processing and loading into data target 116. One skilled in the art will recognize that there may be many other types of data sources available for use by ETL tools.

Server computer 106 includes an instance of data target 116, and is coupled to server computer 102 via network 110. In the illustrative embodiment of FIG. 1, data target 116 is a relational database with tables used as a data warehouse, and includes at least one set of database statistics for query optimization, such as statistics 124, and at least one statistics profile, such as profile 118. Data warehouse application 300 loads into data target 116 the transformed data extracted from data source 114.

Server computer 106 includes an instance of profiles 118, 120, and 122 within data target 116. Profiles 118, 120, and 122 each include parameters for requesting a refresh of some or all of the database statistics, such as statistics 124. In an embodiment of the present invention, multiple profiles may exist within data target 116, and may be based at least in part, on the perceived volume and types of data changes received by data target 116 during an ETL process or task, or over some specific time frame. Profiles 118, 120, and 122 each may be predefined by a developer or database administrator and included in data target 116.

Server computer 106 includes an instance of statistics 124 within data target 116. Database object statistics, such as statistics 124, are used by query engines to determine access paths or access sequences among tables within a database. Data warehouse application 300 uses statistics 124 to create the optimal access pathways for retrieving data from a data warehouse, such as data target 116.

In various embodiments of the present invention, client computer 108 can be a laptop computer, a tablet computer, an application server, a netbook computer, a personal computer (PC), a desktop computer, a personal digital assistant (PDA), a smartphone, or any programmable electronic device capable of communicating with server computers 102, 104, and 106 via network 110. In certain embodiments, client computer 108 can represent a computer system utilizing clustered computers and components that act as a single pool of seamless resources when accessed through network 110, as is common in data centers and with cloud computing applications. In general, client computer 108 can be representative of any computing device or a combination of devices with access to application developer 200, and is capable of executing application developer 200.

Client computer 108 includes an instance of application developer 200, which executes locally on the respective client computer and has the capability to create or update data warehouse application 300 on server computer 102 via network 110. Application developer 200 is a suite of applications including, but not limited to, business intelligence tools, database management tools, metadata management and retrieval tools, reporting tools, and analysis tools used by business professionals for data mining, online analytical processing, and market research. In some embodiments, application developer 200 may be an associated client application created by the vendor or developer of ETL tool 400 for use in a server-client environment. Application developer 200 may use a graphical notation to construct data integration solutions with individual icons for data source 114, data target 116, and the query that relates them. In the depicted environment, application developer 200 uses a user interface, such as UI 112, to receive user input, and to output responses to a user. In the depicted environment, application developer 200 is an application allowing authorized users, such as database developers and architects, to create custom ETL applications, such as data warehouse application 300, using ETL tool 400 for data integration against a central repository of data on a server, such as data target 116 on server computer 106. Application developer 200 is described further in FIG. 2.

In other embodiments of the present invention, data warehouse application 300, application developer 200, ETL tool 400, data source 114, and data target 116 may be on one computer.

UI 112 may utilize a web page application, a command line processor, or any other graphical user interface (GUI). UI 112 includes components used to receive input from a user and transmit the input to application developer 200 residing on the respective client computer. In an embodiment, UI 112 uses a combination of technologies and devices, such as device drivers, to provide a platform to enable users of client computer 108 to interact with application developer 200. In the exemplary embodiment, UI 112 receives input, such as dragging and dropping data icons onto a workspace using a physical input device, such as a keyboard or mouse, via a device driver that corresponds to the physical input device.

In an embodiment of the present invention, application developer 200 residing on client computer 108 allows a developer to create or customize data warehouse application 300 on server computer 102 via network 110. The developer configures data warehouse application 300 with information regarding data source 114, transformation queries or commands, and data target 116 for each ETL task within the job stream. After each ETL task, the user may select to update database statistics 124 within data target 116 using a profile, such as profile 118. The developer may specify the profile name by various ways including, but not limited to, temporal attributes such as day of week and monthly profile names, or with profiles associated with a duration of time since the last update, static profile names, profile names passed by an ETL variable, or profile names retrieved from the database through an SQL query.

ETL tool 400, during runtime of data warehouse application 300, enables data warehouse application 300 to determine the profile names dynamically, and to issue the update commands directly which frees up database management resources. ETL tool 400 enables data warehouse application 300 to connect to data source 114 and data target 116 and issue commands for performing the ETL task and the update to database statistics 124.

Figure 2:
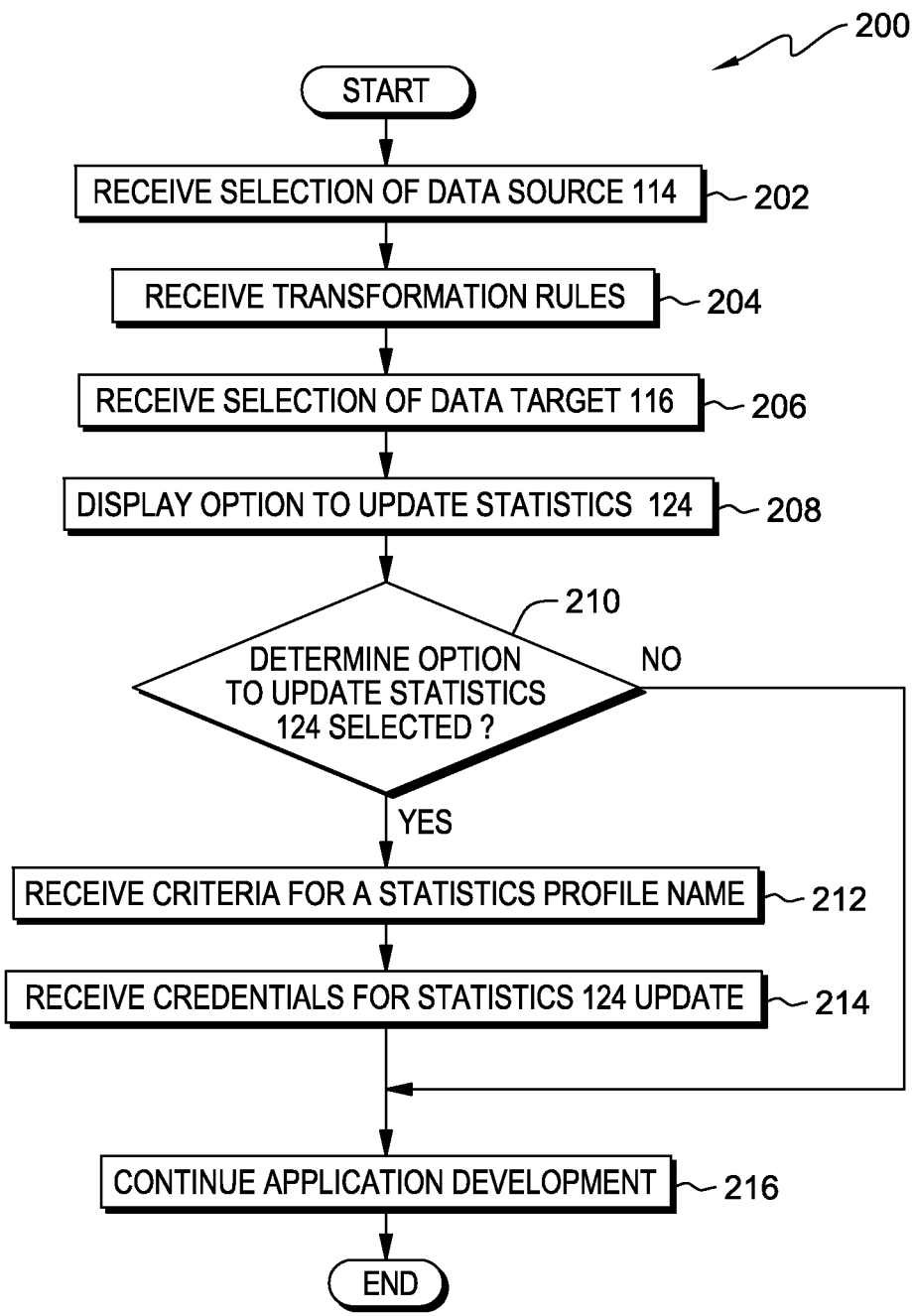
FIG. 2 is a flowchart depicting the operational steps of an application developer for creating an ETL application with the ability to update statistics using a profile, in accordance with an embodiment of the present invention.

FIG. 2 is a flowchart depicting the operational steps of an application developer for creating an ETL application with the ability to update statistics using a profile, in accordance with an embodiment of the present invention. In the illustrative embodiment, application developer 200 running on client computer 108 allows a user to create data warehouse application 300 on server computer 102 via network 110.

Application developer 200 receives a selection of data source 114 (step 202). Application developer 200 provides a user interface, UI 112, which allows a user, such as a database developer or architect, to define data source 114. As noted in FIG. 1, data source 114 may be one or more databases or flat files on one or more computers. For example, application developer 200 allows the user to define the criteria for extracting data from data source 114 including, but not limited to, defining source tables and filter criteria, SQL commands, how to parse the data, and verification of initial structure.

Application developer 200 receives transformation rules (step 204). Application developer 200 allows the user to define one or more transformation rules, such as queries or SQL commands, to transform the extracted data. Application developer 200 allows the user to define the criteria for transforming the extracted data including, but not limited to, parsing the data, cleaning the data, applying a series of rules or functions to the extracted data, checking data integrity, and creating aggregates or disaggregates of the extracted data.

Application developer 200 receives a selection of data target 116 (step 206). Application developer 200 allows the user to define data target 116. For example, application developer 200 allows the user to define the criteria for loading data into data target 116 including, but not limited to, staging data before loading, defining target source tables and selection criteria, defining criteria for audit tables, and defining overwrite/update criteria.

Application developer 200 displays an option to update database statistics 124 (step 208). In an embodiment of the present invention, application developer 200 displays selections to the user for updating statistics 124 after completion of a load operation. In one embodiment, the selections may be displayed graphically using checkboxes or a pull-down menu within a tab for load criteria or post-load criteria.

Application developer 200 determines if option to update database statistics 124 is selected (decision 210). If application developer 200 determines the option to update database statistics 124 is not selected (no branch, decision 210), then application developer 200 continues application development (step 216). In some cases, the user may choose to not update statistics after a certain type of ETL task.

If application developer 200 determines the option to update database statistics 124 is selected (yes branch, decision 210), then application developer 200 receives criteria for a statistics profile name (step 212). For example, the user selects to update statistics 124 of data target 116 and inputs a profile name, such as profile 118. When the user selects to update or refresh statistics 124, dynamic selections may be offered to the user through a graphical user interface, such as UI 112, allowing the user to specify the profile name in various ways. Profile names may be temporal, such as day of week and monthly profile names, or associated with a duration of time since the last update. Profile names may be static, may be passed by an ETL variable, or may be retrieved from a database through an SQL query.

In the case of a temporal criteria, the profile name may be associated with a day of the week or month, and the determination of which profile to use is based, at least in part, on system data or variables available to ETL tool 400 at runtime of data warehouse application 300. For example, the system data includes the current month, allowing the ETL tool 400 to dynamically determine a profile name to use at runtime of data warehouse application 300. In the case of an ETL variable or SQL query, the criteria, such as the variable name or query, are filled in by the user using GUI of UI 112 during creation of data warehouse application 300, but the actual variable or SQL command is passed to ETL tool 400 for processing at runtime of data warehouse application 300.

Application developer 200 receives credentials for statistics 124 update (step 214). Application developer 200 displays a form, which the user fills in with the application credentials, such as application userid, for use by data warehouse application 300 to connect with data target 116. The application userid may be previously defined by a database administrator to have authority to run statistics updates. The credentials are stored as part of data warehouse application 300.

Application developer 200 continues application development (step 216). In one embodiment, if the user is not finished, then the steps listed above may be repeated multiple times to create a job stream of several ETL tasks which form data warehouse application 300. Application developer 200 allows the user to add other tasks to the job stream, such as reporting functions. An example of a multiple step job stream is detailed in FIG. 3. After all steps have been entered and configured, application developer 200 stores the finished application on server computer 102. For example, application developer 200 saves data warehouse application 300 on server computer 102 via network 110.

Figure 3:
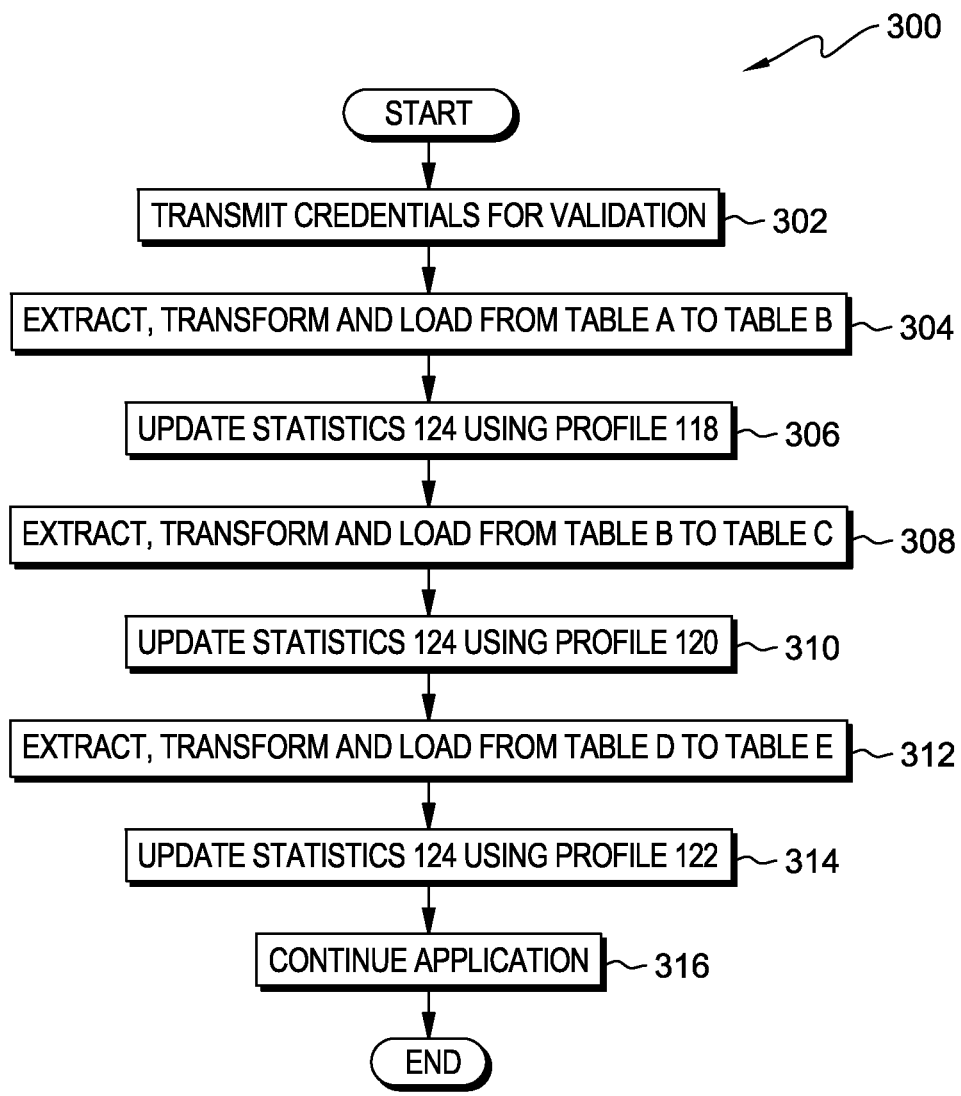
FIG. 3 is a flowchart depicting the operational steps of a data warehouse application for the purpose of showing a multiple step job stream, in accordance with an embodiment of the present invention.

FIG. 3 is a flowchart depicting the operational steps of data warehouse application 300 for the purpose of showing a multiple step job stream, in accordance with an embodiment of the present invention. Data warehouse application 300 is a custom application which extracts data from data source 114, transforms the extracted data to meet requirements of data target 116, loads the transformed data into data target 116, and updates statistics 124 using profiles such as, profiles 118, 120, and 122. In the illustrative example, data warehouse application 300 performs three ETL tasks in a row, with each load followed by a statistics update, and each statistics update using a different statistics profile. The flow depicted in FIG. 3 is merely an illustration, and should not be limiting in the number of possible steps and types of steps within a job stream for a data-related application.

Data warehouse application 300 transmits credentials for validation (step 302). In an embodiment of the present invention, data warehouse application 300 sends the application credentials at the start of the job stream to the database management system (DBMS) of data target 116 to validate that the userid has the authority to both perform load tasks on data target 116, and to run statistics updates on data target 116. Responsive to determining that the application credential has authority to run database statistics updates, data warehouse application 300 loads the transformed data into data target 116. In an alternate embodiment, this validation may be done prior to each load step of the three ETL tasks. In either case, if the userid does not have the proper authority, the ETL job will be aborted. ETL tool 400 may be an integrated part of data warehouse application 300 and provides the database connections, and ability to issue commands to perform the ETL tasks, and statistics updates.

Data warehouse application 300 performs extract, transform, and load of data from table A to table B (step 304). Table A is a table or flat file within data source 114, and table B is a table within data target 116. The details of the ETL task were configured by the user using application developer 200, as shown in FIG. 2.

Data warehouse application 300 updates statistics 124 using profile 118 (step 306). Data warehouse application 300 uses the distributed database connection of ETL tool 400 to issue the command to update statistics 124 using a specified profile, such as profile 118. When the update is completed, data warehouse application 300 receives a return code or message from the DBMS through ETL tool 400. Data warehouse application 300 does not pass control to the next task in the job stream until the statistics update has completed.

Data warehouse application 300 performs extract, transform, and load of data from table B to table C (step 308). Table B and table C are tables within data target 116.

Data warehouse application 300 updates statistics 124 using profile 120 (step 310). In the example, the DBMS may only do a partial update to statistics 124 based on which criteria are listed in profile 120. Data warehouse application 300 does not pass control to the next task in the job stream until the statistics update has completed.

Data warehouse application 300 performs extract, transform, and load of data from table D to table E (step 312). Table D is a table or flat file within data source 114, and table E is a table within data target 116.

Data warehouse application 300 updates statistics 124 using profile 122 (step 314). The DBMS performs the update to statistics 124 based on which criteria are listed in profile 122. Data warehouse application 300 does not pass control to the next task in the job stream until the statistics update has completed.

Data warehouse application 300 continues the data warehouse application (step 316). At this point, all ETL tasks and statistics updates have completed. Data warehouse application 300 may retrieve and format data into a specialized report based on the updated tables in data target 116. The developer of data warehouse application 300 may have included various other tasks to be performed at this point, or the application may be completed.

Figure 4:
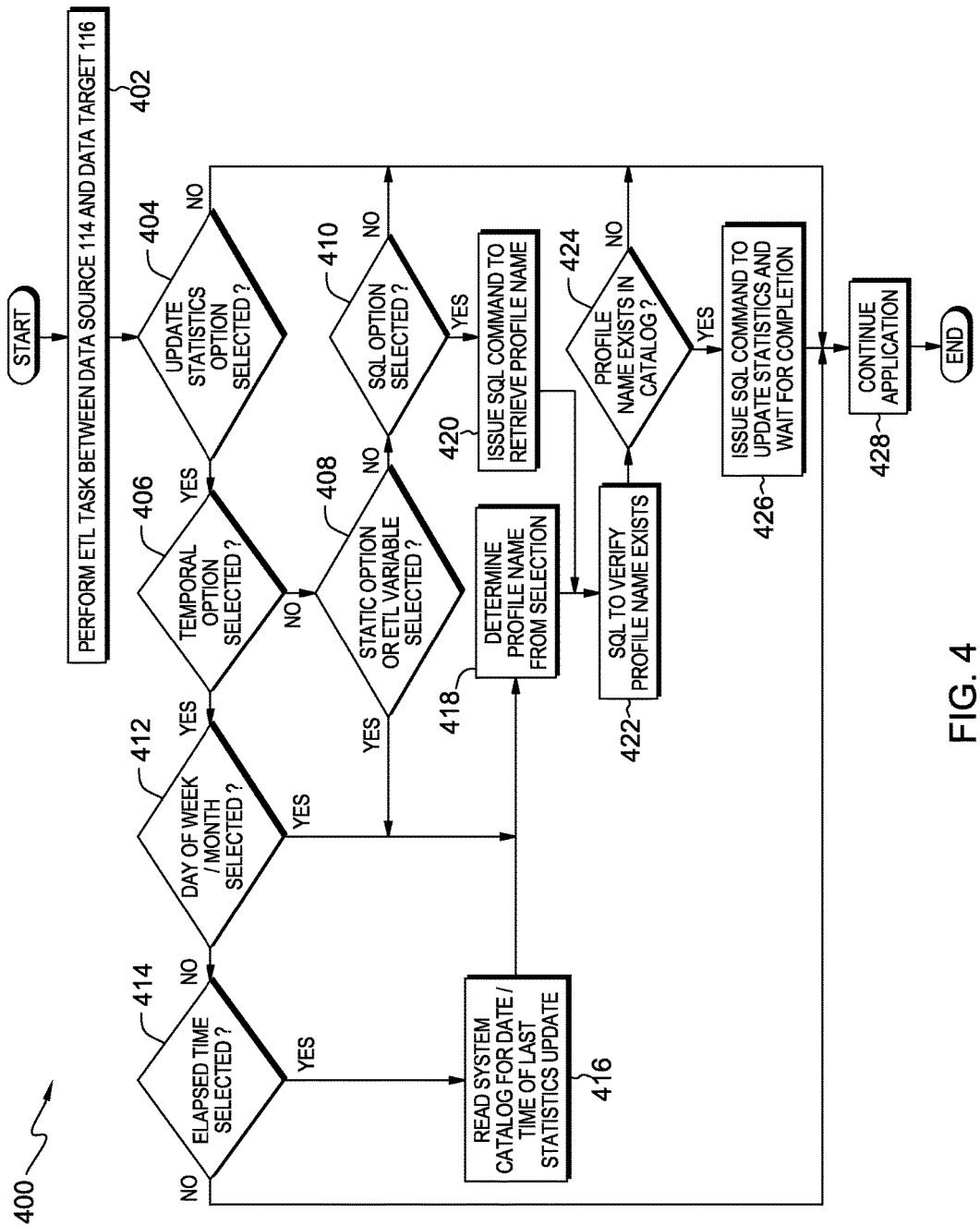
FIG. 4 is a flowchart depicting the operational steps of an ETL tool for the purpose of determining and executing statistics update selections, in accordance with an embodiment of the present invention.

FIG. 4 is a flowchart depicting the operational steps of ETL tool 400 for the purpose of determining and executing statistics update selections, in accordance with an embodiment of the present invention. Data warehouse application 300 comprises a job stream which includes at least one ETL task moving data from data source 114 to data target 116, and at least one update to statistics 124 using a profile, such as profile 118, which is attached to the system catalog of data target 116. ETL tool 400 may be an integrated part of data warehouse application 300 and provides the database connections, and commands to perform the ETL task and the statistics update.

Database statistics, such as statistics 124, and a statistics profile, such as profile 118, are database items which reside in the system catalog of a database, such as data target 116. Profile 118 determines which tables of a database are optimized, and specifies which indices or statistical views are updated, and which characteristics, such as number of records, or average record length, are updated. In an embodiment of the present invention, ETL tool 400 verifies the profile exists, and then issues the command to run profile 118. If a command is issued with an incorrect profile name, or the profile does not exist, then the job stream will fail. An embodiment of the present invention includes validation of a profile name, and validation that the profile exists before executing the command to run the profile to prevent job failures.

ETL tool 400 performs an ETL task between data source 114 and data target 116 (step 402), within the job stream of data warehouse application 300. Prior to the load step of the current ETL task, the credentials of the application userid have been validated by the DBMS of data target 116 to have authority for statistics updates. If the userid did not have the authority for statistics updates, then the task would abort.

ETL tool 400 determines if the update statistics option is selected (decision 404). The ETL code attached to data warehouse application 300 includes the information which can be used to determine if the update statistics option is selected. ETL tool 400 may not always need to update statistics 124 after a load step, such as if an update was recently performed, if more data is updated rather than added, or if a certain time period historically adds a low volume of data. The update option is selected by a user of application developer 200 when creating data warehouse application 300. If ETL tool 400 determines that the update statistics option is selected (yes branch, decision 404), then ETL tool 400 determines if the temporal option is selected (decision 406). If ETL tool 400 determines that the update statistics option is not selected (no branch, decision 404), then ETL tool 400 continues to the next task in the job stream of data warehouse application 300 (step 428).

After determining the update statistics option is selected, the purpose of the remaining flowchart is to determine which statistics profile name is to be used by ETL tool 400 during the current task. The illustrated embodiment of FIG. 4 shows three options or criteria for determining a profile name by type, as in temporal (step 406), static or variable (step 408), and SQL (step 410), but one skilled in the art will recognize more options are possible. While one embodiment is illustrated in FIG. 4, ETL tool 400 may perform the three determinations in any order with associated changes in the flow chart. During development of data warehouse application 300 using application developer 200, selections may have taken the form of checkboxes, or highlights in drop-down menus. During runtime, these selections have been translated into code within data warehouse application 300. From the ETL code, ETL tool 400 determines which selections were made during development. While the following flow is used to illustrate the different types of options available and the responses to each, the code may only contain the selected option with the appropriate criteria to perform the task.

If in decision 404, ETL tool 400 determines that the update statistics option is selected (yes branch), then ETL tool 400 determines if the temporal option is selected (decision 406). The ETL code attached to data warehouse application 300 includes the information which can be used to determine if the temporal option is selected. If ETL tool 400 determines that the temporal option is selected (yes branch, decision 406), then ETL tool 400 determines if day of week, or month is selected (decision 412). If ETL tool 400 determines that the temporal option is not selected, (no branch, decision 406), then ETL tool 400 determines if static option or ETL variable is selected (decision 408).

If in decision 406, ETL tool 400 determines that the temporal option is not selected (no branch), then ETL tool 400 determines if static option or ETL variable is selected (decision 408). The ETL code attached to data warehouse application 300 includes the information which can be used to determine if static option or ETL variable is selected. If ETL tool 400 determines static option or ETL variable is selected (yes branch, decision 408), then ETL tool 400 determines a profile name from selections (step 418). If ETL tool 400 determines static option or ETL variable is not selected (no branch, decision 408), then ETL tool 400 determines if the SQL option is selected (decision 410).

If in decision 408, ETL tool 400 determines that the static option or ETL variable is not selected (no branch), then ETL tool 400 determines if the SQL option is selected (decision 410). The ETL code attached to data warehouse application 300 includes the information which can be used to determine if the SQL option is selected. If ETL tool 400 determines the SQL option is selected (yes branch, decision 410), then ETL tool 400 issues an SQL command to retrieve the profile name (step 420). If ETL tool 400 determines the SQL option is not selected (no branch, decision 410), then ETL tool 400 continues to the next task in the job stream of data warehouse application 300 (step 428).

If in decision 406, ETL tool 400 determines that the temporal option is selected (yes branch), then ETL tool 400 determines if day of week, or month is selected (decision 412). The ETL code attached to data warehouse application 300 includes the information which can be used to determine if day of week, or month is selected. If ETL tool 400 determines day of week, or month is selected, (yes branch, decision 412), then ETL tool 400 determines a profile name from selections (step 418). If ETL tool 400 determines day of week, or month is not selected, (no branch, decision 412), then ETL tool 400 determines if elapsed time is selected (decision 414).

If in decision 412, ETL tool 400 determines that day of week, or month is not selected (no branch), then ETL tool 400 determines if elapsed time is selected (decision 414). The ETL code includes the information which can be used to determine if the elapsed time option is selected. If ETL tool 400 determines elapsed time is selected (yes branch, decision 414), then ETL tool 400 reads the system catalog of data target 116 for date and time of last statistics update (step 416). If ETL tool 400 determines elapsed time is not selected (no branch, decision 414), then ETL tool 400 continues to the next task in the job stream of data warehouse application 300 (step 428), and no further processing is required by ETL tool 400 for the current task in the job stream.

If in decision 414, ETL tool 400 determines that elapsed time is selected (yes branch), then ETL tool 400 reads the system catalog of data target 116 for date and time of last statistics update (step 416). In step 416, ETL tool 400 calculates the length of time since the date and time of the last statistics update. A set of profiles may exist in the system catalog with the profile names being related to a duration of time, such as PROFILE_DAY, PROFILE_WEEK, PROFILE_MONTH, etc. The profiles will be created by a developer or database administrator based on historical information regarding data transfer volumes for various possible durations of time. By identifying a profile name based at least in part by when the last date and time a statistics update was performed, the user is able to dynamically generate a statistics profile name without complex coding requirements. The type of statistics updates required after a week might be different than after a month.

ETL tool 400 determines a profile name from selections (step 418). If the static option is selected, then ETL tool 400 determines the static profile name from the stored ETL code. Application developer 200 allows the user to input a profile name when the static option is selected during creation of data warehouse application 300. If the ETL variable option is selected, then ETL tool 400 determines the profile name from the value of an ETL variable. Application developer 200 allows the user to input an ETL variable name when the ETL variable option is selected during creation of data warehouse application 300. ETL tool 400 receives the variable, determines the variable's value at runtime of data warehouse application 300, and assigns the profile name to be equal to the variable's value. For example, the ETL variable DAYOFWEEK may have been input by the user, and at runtime, the variable value is determined to be MONDAY. ETL tool 400 would determine the profile name to be MONDAY.

For example, when day of week or month is selected (as determined in decision 412), a profile name may be associated with each possible selection, such as PROFILE_MONDAY, PROFILE_TUESDAY, PROFILE_JANUARY, PROFILE_MARCH, etc. ETL tool 400 generates the profile name based, at least in part, on a temporal attribute retrieved from a system variable. Before data warehouse application 300 is first executed, the named profiles are created by a developer or database administrator with criteria based in part on historical information or future projections regarding data transfer volumes for each time period. The type of statistics updates required on Monday might be different than on Wednesday, depending on when data is typically transferred most. For example, long data transfers may happen over the weekend, and the Monday profile may request a full update to all statistics for all tables of data target 116.

When the elapsed time option is selected (as determined in decision 414), a profile name may be associated with each possible duration of time calculated in step 416, such as PROFILE_DAY, PROFILE_WEEK, PROFILE_MONTH, etc.

If in decision 410, ETL tool 400 determines the SQL option is selected (yes branch), then ETL tool 400 issues an SQL command to retrieve the profile name (step 420). Application developer 200 allows the user to input an SQL command when the SQL option is selected during creation of data warehouse application 300. The SQL command is stored in the ETL code. At runtime of data warehouse application 300, ETL tool 400 issues the stored SQL command to retrieve the profile name, and receives a result from the DBMS of data target 116. For example, the profile name may be stored in a field within a table of data target 116.

Using the profile name received from step 418 or step 420, ETL tool 400 issues an SQL command to verify the profile name exists (step 422). While a profile name may be associated with a previous selection, if the statistics profile was not setup by the user or database administrator, the profile may not exist in the system catalog. For example, if PROFILE_MONDAY was never setup, and if a command is issued to run PROFILE_MONDAY, the job will fail. To prevent job failure, and wasted resources, ETL tool 400 formats and issues the SQL command to determine if the profile name exists within the system catalog of data target 116, before sending a command to perform the update.

ETL tool 400 determines if the profile name exists in the system catalog (decision 424). ETL tool 400 receives a response to the SQL command (of step 422) requesting if the profile name exists in the system catalog of data target 116. If ETL tool 400 determines the profile name does exist in the system catalog (yes branch, decision 424), then ETL tool 400 issues the SQL command to update statistics 124 using the verified profile name and waits for completion of the statistics update (step 426). If ETL tool 400 determines the profile name does not exist in DBMS (no branch, decision 424), then ETL tool 400 continues to the next task in the job stream of data warehouse application 300 (step 428), and no further processing is required by ETL tool 400 for the current task in the job stream. An error message regarding the missing profile may be sent to the database administrator, or included with an error log.

If in decision 424, ETL tool 400 determines the profile name does exist in the system catalog (yes branch), then ETL tool 400 issues the SQL command to update statistics 124 using the verified profile name and waits for completion of the statistics update (step 426). ETL tool 400 issues a distributed call to the database to update statistics 124. When the update is completed, ETL tool 400 receives a return code from the DBMS of data target 116 as receipt of confirmation of completion of a database statistics update.

ETL tool 400 continues to the next task in the job stream of data warehouse application 300 (step 428), and no further processing is required by ETL tool 400 for the current task in the job stream.

Figure 5:
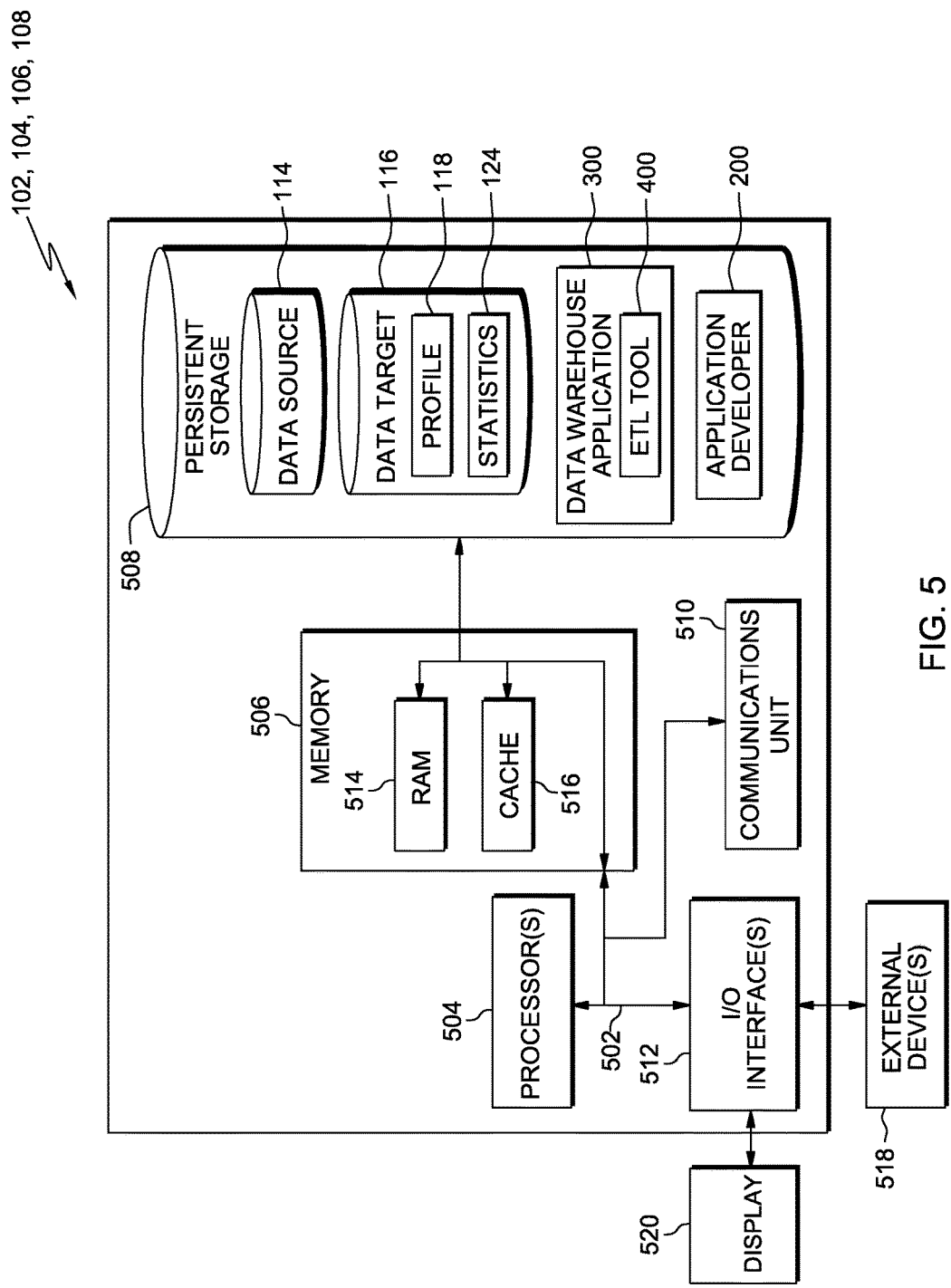
FIG. 5 depicts a block diagram of components of an exemplary computer system for implementing embodiments of the present invention.

FIG. 5 depicts a block diagram of respective components of server computers 102, 104, and 106, and client computer 108, in accordance with an illustrative embodiment of the present invention. It may be appreciated that FIG. 5 provides only an illustration of one implementation and does not imply any limitations with regard to the environments in which different embodiments may be implemented. Many modifications to the depicted environment may be made.

Server computers 102, 104, and 106, and client computer 108 each include respective communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Data warehouse application 300, ETL tool 400, data source 114, data target 116, profile 118, statistics 124 and application developer 200 are stored in respective persistent storage 508 for execution and/or access by one or more of the further respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of server computers 102, 104, and 106, and client computer 108. In these examples, communications unit 510 includes one or more network interface cards. Communications unit 510 may provide communications through the use of either or both physical and wireless communications links. Data warehouse application 300, ETL tool 400, data source 114, data target 116, profile 118, statistics 124, and application developer 200 may be downloaded to respective persistent storage 508 through communications unit 510.

I/O interface(s) 512 allows for input and output of data with other devices that may be connected to server computers 102, 104, and 106, and client computer 108. For example, I/O interface 512 may provide a connection to external device(s) 518 such as a keyboard, a keypad, a touch screen, and/or some other suitable input device. External device(s) 518 can also include portable computer readable storage media such as, for example, thumb drives, portable optical or magnetic disks, and memory cards. Software and data used to practice embodiments of the present invention, e.g., data warehouse application 300, ETL tool 400, data source 114, data target 116, profile 118, statistics 124, and application developer 200, can be stored on such portable computer readable storage media and can be loaded onto respective persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for a computer to process a query on database tables with a job stream comprising a sequence of operational steps, the method comprising:
   receiving, by a computer from a computer program, a computer program credential assigned to the computer program;
   determining by the computer whether the computer program credential assigned to the computer program confers authority to update a database statistic of a target database and authority to execute a load task, based, at least in part, on a profile and reception of an extract, transform, load (ETL) process that indicates that an automatic update to a database statistic is requested by the computer program, each profile including parameters for requesting a refresh of some or all database statistics;
   responsive to a determination that the computer program does not have authority to update the database statistic, aborting the ETL process;
   responsive to a determination that the computer program is assigned the computer program credential that confers authority to update the database statistic and execute the load task, the computer executing the ETL process in which (i) a first form of a data is obtained, (ii) the first form of the data is transformed into a second form of the data, and then (iii) the second form of the data is loaded into the target database;
   responsive to a determination that the computer has completed loading of the second form of the data of the ETL process, into the target database, the computer automatically determining whether an update to the database statistic is to be performed;
   receiving a criteria for a statistics profile name from a user;
   responsive to a determination that the update to the database statistic is to be performed, the computer automatically generating a statistics profile name for updating the database statistic based on at least one of a temporal criteria, a static criteria, an SQL criteria, and an ETL variable;
   the computer automatically determining whether the generated statistics profile name exists within a system catalog of the target database;
   responsive to a determination that the generated statistics profile name does not exist, the computer cancels the job stream or performs a next task in the job stream;
   responsive to a determination that the generated statistics profile name exists, the computer transmitting a command that initiates an automatic update of the database statistic of the target database using the generated statistics profile name; and
   processing a query on database tables that are included in the target database using the database statistic of the target database, wherein the automatic update of the database statistic altered a performance of queries of the database tables.

2. The method of claim 1, wherein the computer generating a profile name for updating the database statistic comprises:
   the computer determining whether the temporal criteria for the profile name is selected by the user, the profile name associated with a day of the week or a day of the month; and
   responsive to a determination that the temporal criteria for the profile name is selected, the computer determining whether the profile name is based, at least in part, on a temporal attribute retrieved from a system variable selected by the user.

3. The method of claim 1, wherein the computer generating a profile name for updating the database statistic comprises:
   the computer determining whether the temporal criteria for the profile name is selected by the user, the temporal criteria associated with a duration of time since a last update to the database;
   the computer determining whether an elapsed time criteria for the profile name is selected by the user; and
   responsive to a determination that the temporal criteria and elapsed time criteria for the profile name are both selected, the computer determining whether the profile name is based, at least in part, on a duration of time since the update to the database statistic was performed.

4. The method of claim 1, wherein the computer generating a profile name for updating the database statistic comprises:
   the computer determining whether the static criteria for the profile name is selected; and
   responsive to a determination that the static criteria for the profile name is selected, the computer accessing the profile name in a portion of stored ETL code of an ETL solution.

5. The method of claim 1, wherein the computer generating a profile name for updating the database statistic comprises:
   the computer determining whether the SQL criteria for the profile name is selected;
   the computer determining whether the profile name exists in the database;
   responsive to a determination that the SQL criteria for the profile name is selected and a determination the profile name exists in the database, the computer formatting and issuing an SQL command stored in ETL code to retrieve the profile name from the target database; and the computer receiving the profile name in a result of the SQL command if the statistics database was set up by the user.

6. The method of claim 1, wherein the computer generating a profile name for updating the database statistic comprises:

the computer determining whether the ETL variable criteria for the profile name is selected;

responsive to a determination that the ETL variable criteria for the profile name is selected, the computer retrieving a value for an ETL variable at runtime; and the computer determining whether the profile name is based, at least in part, on the value of the ETL variable.

7. The method of claim 1, further comprising:

displaying to a user an option to update the database statistic;

responsive to determining that the user has selected the option to update the database statistics, the computer processing a subsequent task in a plurality of tasks that includes a request to update the database statistic.

8. A computer program product for processing a query on database tables with a job stream comprising a sequence of operational steps, the computer program product comprising:

a computer readable storage medium and program instructions stored on the computer readable storage medium, the program instructions comprising:

program instructions to receive from a computer program a computer program credential assigned to the computer program;

program instructions to determine whether the computer program credential assigned to the computer program confers authority to update a database statistic of a target database and authority to execute a load task, based, at least in part, on a profile and reception of an extract, transform, load (ETL) process that indicates that an automatic update to a database statistic is requested by the computer program, each profile including parameters for requesting a refresh of some or all database statistics;

program instructions to respond to a determination that the computer program does not have authority to update the database statistic by aborting the ETL process;

program instructions to respond to a determination that the computer program is assigned the computer program credential that confers authority to update the database statistic and execute the load task by executing the ETL process in which (i) a first form of a data is obtained, (ii) the first form of the data is transformed into a second form of the data, and then (iii) the second form of the data is loaded into the target database;

program instructions to respond to a determination that the computer has completed loading of the second form of the data of the ETL process, into the target database, by automatically determining whether an update to the database statistic is to be performed;

program instructions to receive a criteria for a statistics profile name from a user;

program instructions to respond to a determination that the update to the database statistic is to be performed by automatically generating a statistics profile name for updating the database statistic based on at least one of a temporal criteria, a static criteria, an SQL criteria, and an ETL variable;

program instructions to automatically determine whether the generated statistics profile name exists within a system catalog of the target database;

program instructions to respond to a determination that the generated statistics profile name does not exist by cancelling the job stream or performing a next task in the job stream;

program instructions to respond to a determination that the generated statistics profile name exists by transmitting a command that initiates an automatic update of the database statistic of the target database using the generated statistics profile name; and program instructions to process a query on database tables that are included in the target database using the database statistics of the target database, wherein the automatic update of the database statistic altered a performance of queries of the database tables.

9. The computer program product of claim 8, wherein program instructions to generate a profile name for updating the database statistic comprises:

program instructions to determine whether the temporal criteria for the profile name is selected by the user, the profile name associated with a day of the week or a day of the month; and program instructions to respond to a determination that the temporal criteria for the profile name is selected by determining whether the profile name is based, at least in part, on a temporal attribute retrieved from a system variable selected by a user.

10. The computer program product of claim 8, wherein program instructions to generate a profile name for updating the database statistic comprises:

program instructions to determine whether the temporal criteria for the profile name is selected by the user, the temporal criteria associated with a duration of time since a last update to the database;

program instructions to determine whether an elapsed time criteria for the profile name is selected by the user; and program instructions to respond to a determination that the temporal criteria and elapsed time criteria for the profile name are both selected by determining whether the profile name is based, at least in part, on a duration of time since the update to the database statistic was performed.

11. The computer program product of claim 8, wherein program instructions to generate a profile name for updating the database statistic comprises:

program instructions to determine whether the static criteria for the profile name is selected; and program instructions to respond to a determination that the static criteria for the profile name is selected by accessing the profile name in a portion of stored ETL code of an ETL solution.

12. The computer program product of claim 8, wherein program instructions to generate a profile name for updating the database statistic comprises:

program instructions to determine whether the SQL criteria for the profile name is selected;

program instructions to determine whether the profile name exists in the database;

program instructions to respond to a determination that the SQL criteria for the profile name is selected and a determination the profile name exists in the database by formatting and issuing an SQL command stored in ETL code to retrieve the profile name from the target database; and program instructions to receive the profile name in a result of the SQL command if the statistics database was set up by the user.

13. The computer program product of claim 8, wherein program instructions to generate a profile name for updating the database statistic comprises:

program instructions to determine whether the ETL variable criteria for the profile name is selected;

program instructions to respond to a determination that the ETL variable criteria for the profile name is selected by retrieving a value for an ETL variable at runtime; and program instructions to determine whether the profile name is based, at least in part, on the value of the ETL variable.

14. The computer program product of claim 8, further comprising:

program instructions to display to a user an option to update the database statistic;

program instructions to respond to a determination that the user has selected the option to update the database statistics by processing a subsequent task in a plurality of tasks that includes a request to update the database statistic.

15. A computer system for processing a query on database tables with a job stream comprising a sequence of operational steps, the computer system comprising:

one or more computer processors;

one or more computer readable storage media;

program instructions stored on the computer readable storage media for execution by at least one of the one or more processors, the program instructions comprising:

program instructions to receive from a computer program a computer program credential assigned to the computer program;

program instructions to determine whether the computer program credential assigned to the computer program confers authority to update a database statistic of a target database and authority to execute a load task, based, at least in part, on a profile and reception of an extract, transform, load (ETL) process that indicates that an automatic update to a database statistic is requested by the computer program, each profile including parameters for requesting a refresh of some or all database statistics;

program instructions to respond to a determination that the computer program does not have authority to update the database statistic by aborting the ETL process;

program instructions to respond to a determination that the computer program is assigned the computer program credential that confers authority to update the database statistic by executing the ETL process in which (i) a first form of a data is obtained, (ii) the first form of the data is transformed into a second form of the data, and then (iii) the second form of the data is loaded into the target database;

program instructions to respond to a determination that the computer has completed loading of the second form of the data of the ETL process, into the target database, by automatically determining whether an update to the database statistic is to be performed;

program instructions to receive a criteria for a statistics profile name from a user;

program instructions to respond to a determination that the update to the database statistic is to be performed by automatically generating a statistics profile name for updating the database statistic based on at least one of a temporal criteria, a static criteria, an SQL criteria, and an ETL variable;

program instructions to automatically determine whether the generated statistics profile name exists within a system catalog of the target database;

program instructions to respond to a determination that the generated statistics profile name does not exist by cancelling the job stream or performing a next task in the job stream;

program instructions to respond to a determination that the generated statistics profile name exists by transmitting a command that initiates an automatic update of the database statistic of the target database using the generated statistics profile name; and program instructions to process a query on database tables that are included in the target database using the database statistics of the target database, wherein the automatic update of the database statistic altered a performance of queries of the database tables.

16. The computer system of claim 15, wherein program instructions to generate a profile name for updating the database statistic comprises:

program instructions to determine whether the temporal criteria for the profile name is selected by the user, the profile name associated with a day of the week or a day of the month; and program instructions to respond to a determination that the temporal criteria for the profile name is selected by determining whether the profile name is based, at least in part, on a temporal attribute retrieved from a system variable selected by a user.

17. The computer system of claim 15, wherein program instructions to generate a profile name for updating the database statistic comprises:

program instructions to determine whether the temporal criteria for the profile name is selected by the user, the temporal criteria associated with a duration of time since a last update to the database;

program instructions to determine whether an elapsed time criteria for the profile name is selected by the user; and program instructions to respond to a determination that the temporal criteria and elapsed time criteria for the profile name are both selected by determining whether the profile name is based, at least in part, on a duration of time since the update to the database statistic was performed.

18. The computer system of claim 15, wherein program instructions to generate a profile name for updating the database statistic comprises:

program instructions to determine whether the static criteria for the profile name is selected; and program instructions to respond to a determination that the static criteria for the profile name is selected by accessing the profile name in a portion of stored ETL code of an ETL solution.

19. The computer system of claim 15, wherein program instructions to generate a profile name for updating the database statistic comprises:

program instructions to determine whether the SQL criteria for the profile name is selected;

program instructions to determine whether the profile name exists in the database;

program instructions to respond to a determination that the SQL criteria for the profile name is selected and a determination the profile name exists in the database by formatting and issuing an SQL command stored in ETL code to retrieve the profile name from the target database; and program instructions to receive the profile name in a result of the SQL command if the statistics database was set up by the user.

20. The computer system of claim 15, wherein program instructions to generate a profile name for updating the database statistic comprises:

program instructions to determine whether the ETL variable criteria for the profile name is selected;

program instructions to respond to a determination that the ETL variable criteria for the profile name is selected by retrieving a value for an ETL variable at runtime; and program instructions to determine whether the profile name is based, at least in part, on the value of the ETL variable.

\* \* \* \* \*